United States Patent
Li

(10) Patent No.: US 8,994,350 B2
(45) Date of Patent: Mar. 31, 2015

(54) LOAD TRANSIENT DETECTION AND CLOCK RESET CIRCUIT

(75) Inventor: Yang Li, Los Altos, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 504 days.

(21) Appl. No.: 12/946,662

(22) Filed: Nov. 15, 2010

(65) Prior Publication Data

US 2012/0119720 A1    May 17, 2012

(51) Int. Cl.
*H02M 3/158*    (2006.01)
*H02M 3/156*    (2006.01)

(52) U.S. Cl.
CPC ...... *H02M 3/158* (2013.01); *H02M 2003/1566* (2013.01)
USPC ............................. 323/284; 323/271; 323/283

(58) Field of Classification Search
CPC .. G05F 1/10; G05F 1/613; H02M 2003/1566; H02M 3/158; H02M 3/156; H02M 3/1588
USPC ................... 323/223, 282, 284.285, 323, 351
See application file for complete search history.

(56) References Cited

U.S. PATENT DOCUMENTS

| | | | |
|---|---|---|---|
| 6,366,070 B1* | 4/2002 | Cooke et al. | 323/284 |
| 8,330,437 B1* | 12/2012 | Hartman | 323/271 |
| 2002/0125869 A1* | 9/2002 | Groom et al. | 323/283 |
| 2007/0013356 A1* | 1/2007 | Qiu et al. | 323/288 |
| 2009/0028273 A1* | 1/2009 | Lin et al. | 375/324 |
| 2009/0072807 A1* | 3/2009 | Qiu et al. | 323/285 |
| 2011/0205761 A1* | 8/2011 | Tschirhart et al. | 363/21.02 |

* cited by examiner

*Primary Examiner* — Jeffrey Sterrett
*Assistant Examiner* — Gustavo Rosario Benitez
(74) *Attorney, Agent, or Firm* — Fenwick & West LLP

(57) ABSTRACT

A switching regulator comprises a PWM controller that controls switching of a power converter via a PWM control signal. The switching regulator detects load transients in the load driven by the power converter. Responsive to the detection of a load transient, the switching regulator resets a PWM clock synchronously with a fast clock operating at a higher frequency than the PWM clock. By doing so, the switching regulator beneficially responds more quickly to changes in the load than with conventional architectures that utilize only the slower PWM clock. This provides improved transient response without sacrificing power efficiency.

16 Claims, 8 Drawing Sheets

LOAD TRANSIENT DETECTION AND CLOCK RESET CIRCUIT

BACKGROUND OF THE INVENTION

1. Field of the Invention

The present invention relates to power electronics and, more specifically, to a switching voltage regulator.

2. Description of the Related Arts

Switching voltage regulators are commonly utilized in a wide variety of electronic circuits because of their high power conversion efficiency. A common concern in the design and use of switching regulators is switching loss. Generally, switching loss increases as the switching frequency of the regulator increases. Thus, to reduce switching loss, a slower switching frequency should be used. However, as the switching frequency decreases, the load transient response of the switching regulator also becomes slower. A slow transient response may cause the output voltage to deviate from its desired value because the regulator cannot respond quickly enough to changing load demands.

FIG. 1A is a block diagram illustrating a conventional switching regulator 100. Switching regulator 100 comprises boost converter 102 and PWM controller 104. Other conventional circuit components are omitted for clarity of description. Boost converter 102 receives input voltage $V_{IN}$ and supplies regulated output voltage $V_{OUT}$ to drive a load 106. PWM controller 104 controls switching of boost converter 102 via control signal PWM_CTRL according to a conventional pulse width modulation (PWM) technique. PWM_CTRL comprises a series of variable width pulses outputted at a fixed frequency. PWM controller 104 outputs one pulse of PWM_CTRL for each clock cycle of CLK_IN. PWM controller 104 also monitors various characteristics of boost converter 102 via feedback control signal FB_CTRL, and varies the duty cycle of PWM_CTRL to achieve the desired output power regulation.

FIG. 1B is a waveform diagram illustrating the transient response problem in the context of conventional switching regulator 100. The waveforms illustrate a load current $I_L$ through load 106, clock signal CLK_IN, and PWM control signal PWM_CTRL. Between times $t_0$ and $t_1$, load current $I_L$ remains constant and PWM_CTRL controls switching of boost controller 102 according to a fixed duty cycle. At a time $t_1$, the load demand changes and load current $I_L$ increases. To meet the increased load demand, PWM controller 104 must increase the duty cycle of PWM_CTRL. However, PWM controller 104 cannot begin adjusting the duty cycle of PWM_CTRL until the start of the next clock cycle at time $t_2$. Thus, there is a transient delay, $t_d = t_2 - t_1$, during which $V_{OUT}$ may begin to droop. This transient delay problem is exacerbated further as switching frequency is reduced. As a result, designers and users of conventional switching regulators are faced with an undesirable tradeoff between power efficiency and transient response when selecting a switching frequency.

SUMMARY OF THE INVENTION

A switching regulator, controller circuit, and method for controlling a switching regulator according to various embodiments of the present invention advantageously utilizes a slower PWM clock to control switching of a power converter while utilizing a faster internal clock to adjust the PWM to load transients. As a result, the switching regulator provides improved transient response compared to conventional architectures without sacrificing power efficiency.

In a first aspect, a switching regulator comprises a PWM controller, a power converter, a load transient detection circuit, and a clock generator. The PWM controller is configured to receive a PWM clock and generate a PWM control signal based on the PWM clock. The power converter receives the PWM control signal and provides regulated power to a load. The regulated power is controllable by varying the duty cycle of the PWM control signal. The load transient detection circuit is configured to detect an increase in load that exceeds a detection threshold and output a load transient detection signal to a clock generator. The clock generator generates the PWM clock from a faster internal clock (e.g., using a clock divider circuit). The clock generator furthermore resets the PWM clock synchronously with the fast clock responsive to detecting the increase in load. In one embodiment, resetting the PWM clock comprises generating a new clock cycle of the PWM clock synchronously with a next clock cycle of the fast clock after the reset. Then, the clock generator continues to generate new clock cycles of the PWM clock at the configured PWM clock frequency. In one embodiment, the load transient detection circuit furthermore asserts a non-switching mode control signal responsive to the detecting a decrease in load demand. Responsive to the non-switching mode being asserted, the PWM controller enters a non-switching mode. In non-switching mode, the PWM controller monitors feedback signals from the power converter and returns to switching mode synchronously with the fast clock when a sensed output voltage drops below a threshold voltage.

In a second aspect, a controller circuit for a switching regulator controls operation of a power converter. A PWM controller is configured to receive a PWM clock and generate a PWM control signal based on the PWM clock for controlling switching of a power converter. A load transient detection circuit is configured to detect an increase in load that exceeds a detection threshold and output a load transient detection signal to a clock generator. The clock generator receives a fast clock and generates the PWM clock having a slower frequency than the fast clock. In response to detecting the increase in load, the clock generator resets the PWM clock synchronously with the fast clock.

In a third aspect, a method controls a switching regulator according to the operating principles described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

As will be explained in more detail below with reference to the figures, a switching regulator, controller, and a method according to various embodiments of the present invention provides regulated power to a load with improved transient response relative to conventional architectures. In one embodiment, the switching regulator detects light to heavy load transients exceeding a detection threshold and resets a PWM clock synchronously with a fast clock operating at a higher frequency than the PWM clock. Furthermore, when operating in non-switching mode, the PWM controller can return to switching mode synchronously with the fast clock. By doing so, the switching regulator beneficially responds more quickly to changes in the load because it can adjust to the transient synchronously with the faster clock rather than with the slower PWM clock. This provides improved transient response without sacrificing the power efficiency generally resulting from a slower switching frequency.

Figure 1A:
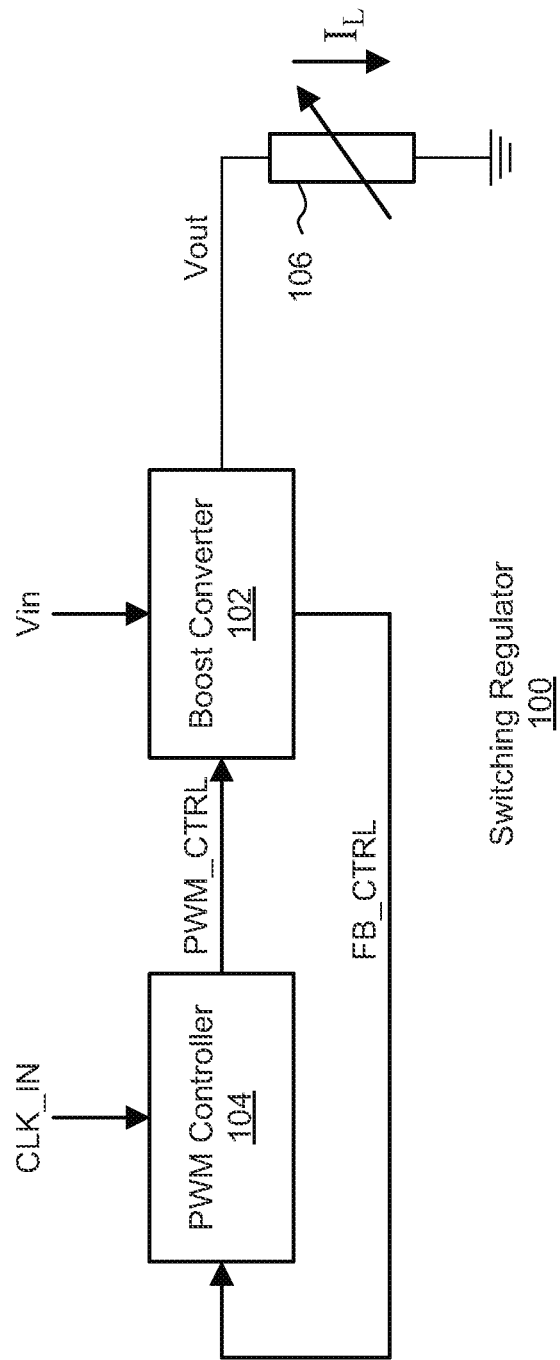
FIG. 1A illustrates a typical switching regulator.
Figure 1B:
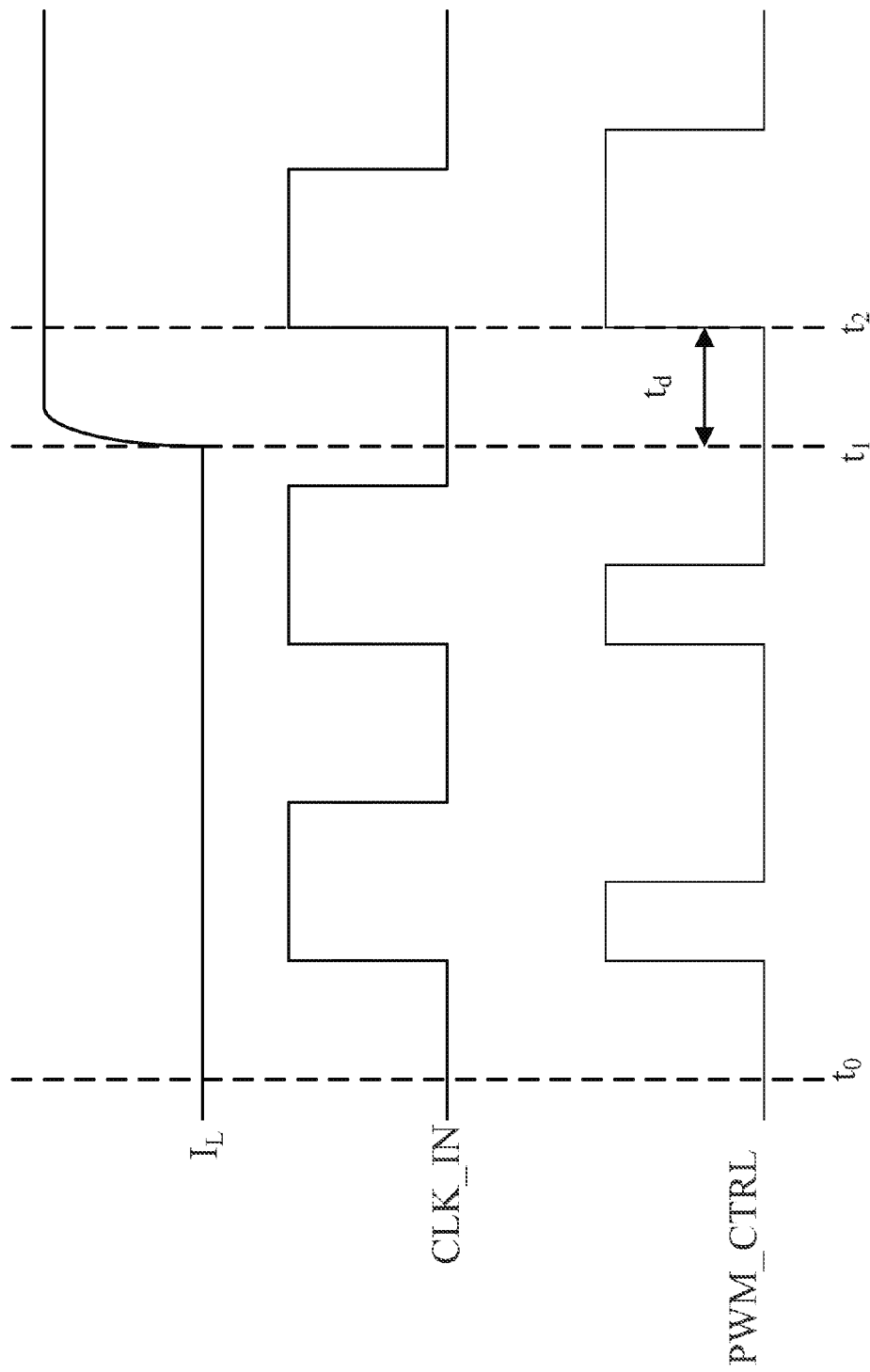
FIG. 1B illustrates typical waveforms associated with operation of a typical switching regulator.
Figure 2:
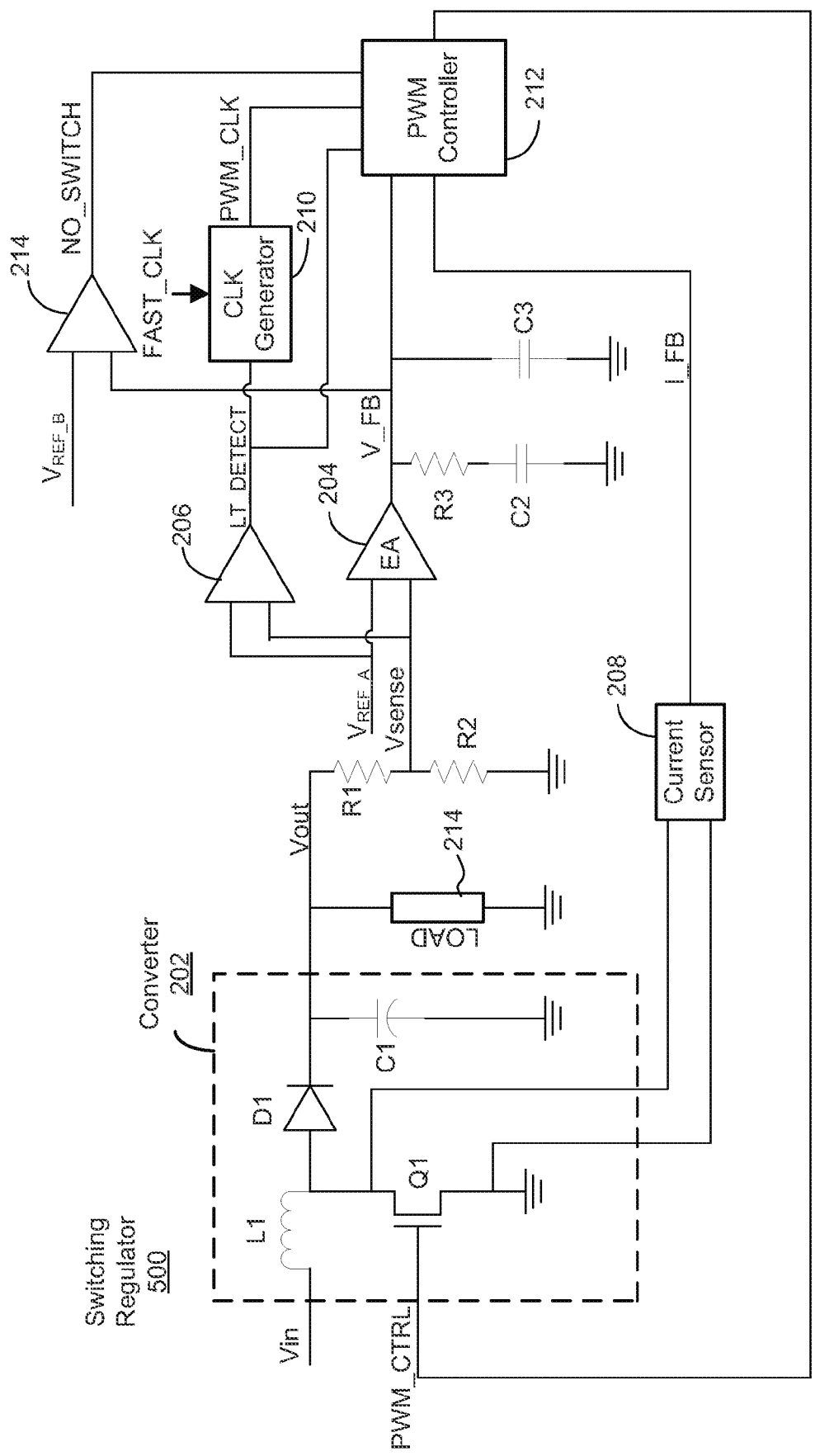
FIG. 2 illustrates a switching regulator according to one embodiment of the present invention.

FIG. 2 illustrates a switching regulator 200 in accordance with one embodiment of the present invention. Switching regulator 200 comprises converter 202, current sensor 208, error amplifier 204, first comparator 206, second comparator 214, clock generator 210, Pulse Width Modulation (PWM) controller 212, a voltage divider comprising resistors R1 and R2, and an output filter comprising resistor R3 and capacitors C2, C3. Other conventional circuit components are omitted from the figure for clarity of description.

Converter 202 receives supply voltage $V_{IN}$ and provides regulated output voltage $V_{OUT}$ to load 214. In one embodiment, converter 202 comprises inductor L1, diode D1, capacitor C1, and switch Q1 (e.g., an NMOS transistor) arranged in a conventional boost converter configuration. When switch Q1 turns on, current increases through inductor L1. The input power from supply voltage $V_{IN}$ is stored in inductor L1 because diode D1 becomes reverse biased and output power is provided to load 214 via capacitor C1. When switch Q1 turns off, diode D1 becomes forward biased and the input power stored in inductor L1 is transferred to $V_{OUT}$. Output voltage $V_{OUT}$ provides power to the load and charges the output capacitor C1. Switching of Q1 is controlled by control signal PWM_CTRL according to a PWM technique in order to maintain $V_{OUT}$ at a desired voltage.

While converter 202 is illustrated and described as a boost converter, other types of conventional converters may alternatively be used. For example, in various embodiments, converter 202 may comprise a buck converter, a buck-boost converter, a flyback converter, or another conventional type of converter.

PWM controller 212 receives voltage feedback $V_{FB}$, current feedback $I_{FB}$, and input clock PWM_CLK, and NO_SWITCH, and generates PWM control signal PWM_CTRL to control switching of converter 202 via a PWM technique. In PWM, the output power of converter 202 is controlled by varying the widths of the pulses driving switch Q1. In one embodiment, PWM controller 212 can operate in either a switching mode or a non-switching mode (or sleep mode) based on a mode control input NO_SWITCH. In switching mode, PWM controller 212 controls the duty cycle of PWM_CTRL in order to stabilize $V_{OUT}$ at a substantially constant voltage as described below. In non-switching mode, PWM controller 212 turns off switching (i.e., sets the duty cycle of PWM_CTRL to 0%). Non-switching mode is useful as a power saving mechanism during the transient period when the load demand decreases, i.e., the load changes from heavy to light.

In one embodiment, PWM controller 212 utilizes a current mode control technique to control the duty cycle of PWM_CTRL when in switching mode. In current mode control operation, the PWM controller 212 utilizes both current and voltage feedback signals ($I_{FB}$ and $V_{FB}$ respectively) to maintain output voltage $V_{OUT}$ at a desired level and limit the peak current through PWM switch Q1. The frequency of the pulses in PWM_CTRL is controlled by PWM_CLK such that PWM controller 204 generates one pulse in PWM_CTRL for each clock cycle of PWM_CLK (e.g., on the rising edge of PWM_CLK). Widths of the pulses in PWM_CTRL are varied based on control signal $V_{FB}$ and $I_{FB}$ in order to maintain $V_{OUT}$ at a substantially constant level when the load demand is stable, and limit current through PWM switch Q1 to a peak current level. In non-switching mode, the duty cycle of PWM_CTRL is set to 0% and switching is effectively turned off.

Voltage feedback signal $V_{FB}$ and current feedback signal $I_{FB}$ are utilized by PWM controller 212 to regulate the duty cycle of PWM_CTRL. To produce voltage feedback signal $V_{FB}$, output voltage $V_{OUT}$ is sensed and an error signal $V_{FB}$ is generated representing the difference between the sensed voltage and a reference voltage. In one embodiment, resistors R1, R2 are coupled to $V_{OUT}$ in a voltage divider configuration. The voltage divider produces a sensed voltage $V_{SENSE}$ proportional to $V_{OUT}$. $V_{SENSE}$ is coupled to a first input terminal (e.g., a negative input terminal) of error amplifier 204. A first reference voltage $V_{REF\_A}$ is coupled to a second input terminal (e.g., a positive input terminal) of error amplifier 204. Error amplifier 204 outputs error signal $V_{FB}$ proportional to the difference between $V_{SENSE}$ and $V_{REF}$. Thus, if $V_{OUT}$ begins to drop during a transient state (e.g., due to increased load demand), error signal $V_{FB}$ increases, and PWM controller 212 will increase the duty cycle of PWM_CTRL. Similarly, if $V_{OUT}$ begins to rise during a transient state (e.g., due to decreased load demand), error signal $V_{FB}$ decreases and PWM_CTRL will decrease the duty cycle of PWM_CTRL. Thus, $V_{FB}$ represents changes to the load because $V_{FB}$ will rise when the load is changing from light to heavy, and $V_{FB}$ will fall when the load is changing from heavy to light. When the load is stable, PWM controller 212 acts to maintain $V_{FB}$ at a substantially constant voltage. Resistor R3 and capacitors C2, C3 are configured in an integrator configuration as an output filter to stabilize $V_{FB}$.

In a current feedback path, current sensor 208 senses the current through PWM transistor Q1 using any conventional current sensing technique and generates a feedback voltage $I_{FB}$ representing the sensed current. $I_{FB}$ is provided as a feedback signal to PWM controller 212 and utilized to allow PWM controller 212 to limit the peak current through PWM switch Q1.

A load transient detection circuit detects light to heavy load transients in switching regulator 200. In one embodiment, the load transient detection circuit comprises first comparator 206 that compares $V_{REF\_A}$ to $V_{SENSE}$ and outputs comparison signal LT_DETECT. LT_DETECT indicates whether the sensed voltage (proportional to $V_{OUT}$) is higher or lower than $V_{REF\_A}$. Thus, a rising edge of LT_DETECT indicates a load transient from a lighter load to a heavier load that exceeds a detection threshold. Beneficially, LT_DETECT will respond to a light to heavy load transient relatively fast compared to $V_{FB}$. $V_{FB}$ responds relatively slowly to changes in the load because it is a stabilized output. In contrast, LT_DETECT will be asserted almost immediately when $V_{SENSE}$ falls below $V_{REF\_A}$. LT_DETECT is outputted to clock generator 210 as utilized as described below.

Clock generator 210 is configured to receive LT_DETECT from first comparator 206 and to receive an input clock FAST_CLK. Clock generator 210 generates a new clock PWM_CLK that is slower than FAST_CLK. For example, PWM_CLK may run 20-30 times slower than FAST_CLK. By monitoring LT_DETECT, clock generator 210 detects when $V_{SENSE}$ falls below a detection threshold (represented by $V_{REF_A}$) and applies a reset to PWM_CLK on the next cycle of FAST_CLK. For example, in one embodiment, CLK generator 210 applies the reset upon detection of a rising edge of LT_DETECT, i.e., when the load transient detection circuit detects a transition from a lighter load to a heavier load that exceeds a detection threshold (such that $V_{SENSE}$ drops below $V_{REF\_A}$).

When the reset occurs, PWM_CLK begins a new clock cycle and then continues to operate with the same clock frequency during steady state operation (i.e., when the load is stable). Thus, the reset effectively applies a phase shift to PWM_CLK. By resetting PWM_CLK synchronously with FAST_CLK when a load transient is detected, switching regulator 200 beneficially responds to the transient more quickly. Thus, in the worst case scenario, switching regulator 200 begins adjusting to the transient within one clock period of FAST_CLK rather than the longer period of PWM_CLK. However, during steady state operation, switching regulator 200 still switches according to the slower PWM_CLK for improved power efficiency. Thus, relative to conventional regulators, switching regulator 200 provides improved transient response without sacrificing power efficiency.

Figure 3:
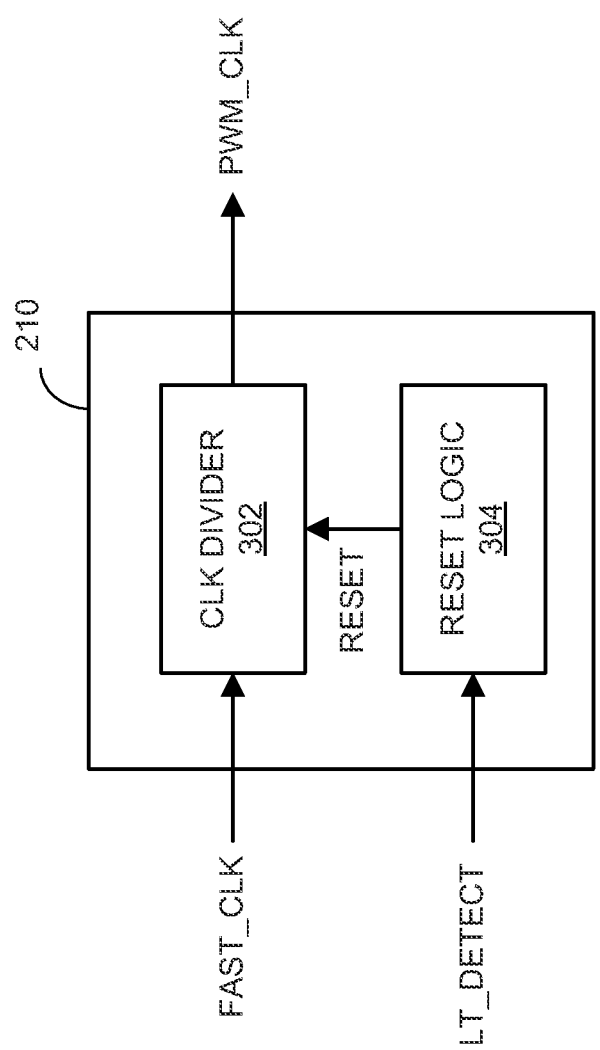
FIG. 3 illustrates a clock generator according to one embodiment of the present invention.

FIG. 3 illustrates a more detailed embodiment of clock generator 210. In the illustrated embodiment, clock generator 210 comprises clock divider 302 and reset logic 304. Clock divider 302 receives FAST_CLK and generates PWM_CLK having a slower clock frequency than FAST_CLK. Clock divider 302 also receives a reset signal (RESET) that when asserted, restarts CLK_OUT on the next cycle of FAST_CLK.

Reset logic 304 comprises digital logic for generating the reset signal when reset conditions are met. For example, reset logic 304 may be configured to detect a rising edge of LT_DETECT and generate the reset signal upon the detection.

Figure 4:
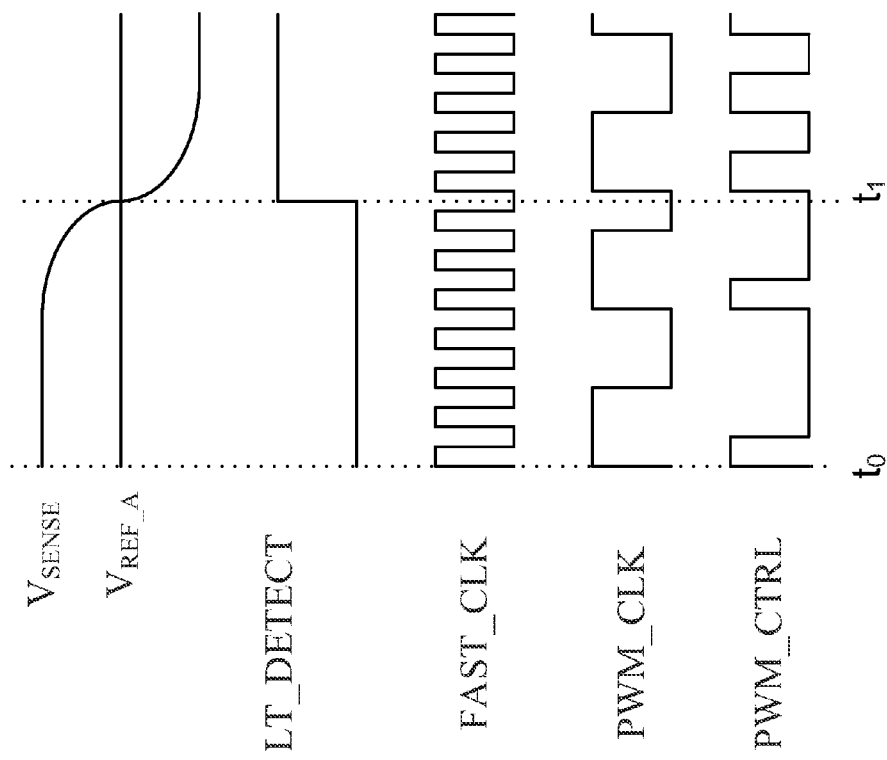
FIG. 4 illustrates example waveforms associated with operation of the switching regulator, according to one embodiment of the present invention.

FIG. 4 is a waveform diagram illustrating an example operation of first comparator 206, clock generator 210, and PWM controller 212 in response to an increase in load demand. In the illustrated waveforms, PWM_CLK operates at a constant frequency 4 times slower than FAST_CLK (in practice, PWM_CLK and FAST_CLK may have a different frequency ratio. For example, PWM_CLK may be 20 to 30 times slower than FAST_CLK). Between time $t_0$ and $t_1$, $V_{SENSE}$ is above $V_{REF\_A}$ and LT_DETECT is therefore low. At time $t_1$, $V_{SENSE}$ drops below $V_{REF}$ (e.g., due to an increase in load demand) and LT_DETECT is asserted. Clock generator detects the rising edge of LT_DETECT, and at the start of the next cycle of FAST_CLK following $t_1$, clock generator 210 resets PWM_CLK. Thus, a new cycle of PWM_CLK begins synchronously with the next cycle of FAST_CLK following $t_1$. Following the reset, PWM_CLK continues to operate at its configured frequency (e.g., 4 times slower than FAST_CLK). PWM_CTRL therefore adjusts its duty cycle to compensate for the increase in load demand synchronously with FAST_CLK rather than needing to wait for a full cycle of the slower PWM clock to complete. As a result, converter 202 can stabilize $V_{OUT}$ faster and power converter 202 will exhibit improved transient response compared to conventional architectures.

Referring back to FIG. 2, operation of non-switching mode is now described. A switch mode control circuit generates NO_SWITCH to toggle PWM controller 212 between switching mode and non-switching mode. Generally, during steady-state operation (i.e., no load transients are present), NO_SWITCH configures PWM controller 212 to operate in switching mode. However, when the switch mode control circuit detects a change in load demand from a heavier load to a lighter load (i.e., $V_{FB}$ falls below a detection threshold), NO_SWITCH controls PWM controller 212 to enter non-switching mode. The PWM controller returns to switch mode once $V_{OUT}$ is substantially stabilized.

In one embodiment of the switch mode control circuit, second comparator 214 compares error signal $V_{FB}$ to a second reference voltage $V_{REF\_B}$ and produces a switching mode control output NO_SWITCH indicating whether $V_{FB}$ is higher or lower than $V_{REF\_B}$. Generally, $V_{REF\_B}$ is set such that NO_SWITCH will be low during steady state operation, and PWM controller 212 will operate in switching mode. When the load becomes lighter, $V_{SENSE}$ increases with respect to $V_{REF\_A}$, thereby decreasing $V_{FB}$ with respect to $V_{REF\_B}$. If $V_{FB}$ drops below $V_{REF\_B}$ comparator 214 asserts NO_SWITCH, causing PWM controller 212 to enter non-switching mode. In one embodiment, PWM controller may be configured to enter switching mode synchronously with the fast clock rather than the slower PWM clock. Once in non-switching mode, $V_{OUT}$ will begin to drop, thereby increasing $V_{FB}$ with respect $V_{REF\_B}$. When $V_{FB}$ rises above $V_{REF\_B}$, NO_SWITCH resets causing PWM controller 212 to return to switching mode operation.

In one embodiment, PWM controller 212, when in non-switching mode, monitors LT_DETECT and returns to switching mode when a rising edge of LT_DETECT is detected. As described above, feedback signal $V_{FB}$ responds relatively slowly to changes in $V_{OUT}$ as compared to LT_DETECT because $V_{FB}$ is stabilized by the output filtering. Thus, as $V_{OUT}$ decreases in non-switching mode, LT_DETECT may be asserted as soon as $V_{SENSE}$ falls below $V_{REF\_A}$ and before NO_SWITCH turns off. The PWM controller 212 thus detects when LT_DETECT is asserted and returns PWM controller 212 to switching mode. Furthermore, because PWM_CLK will also be reset upon assertion of LT_DETECT, PWM controller 212 will return to switching mode synchronously with the next cycle of FAST_CLK.

Figure 5:
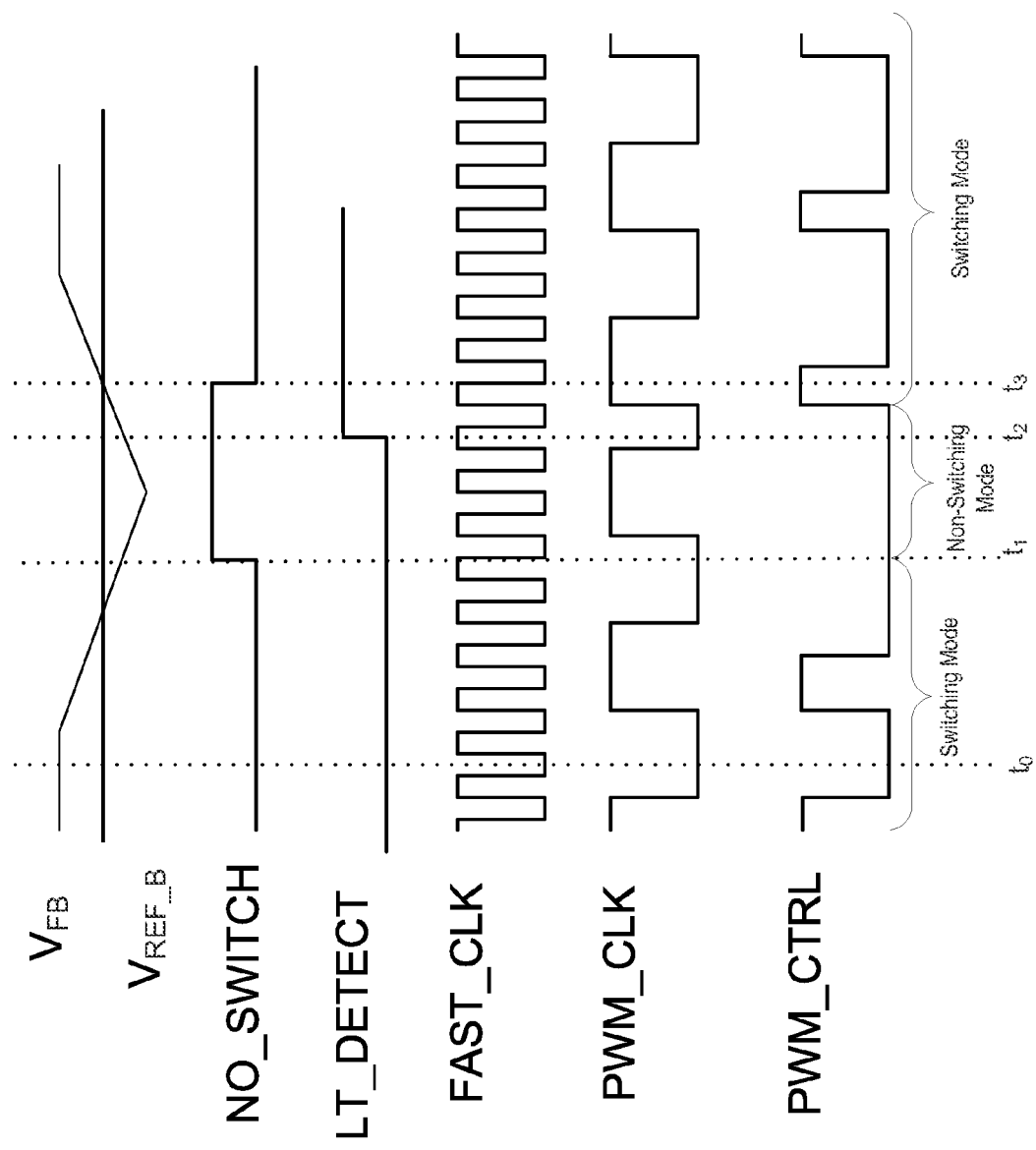
FIG. 5 illustrates example waveforms associated with operation of the switching regulator, according to one embodiment of the present invention.

FIG. 5 is a waveform diagram illustrating the switching mode control operation described above when the load demand decreases. Between $t_0$ and $t_1$, $V_{FB}$ decreases in response to the decrease in the load demand. At time $t_1$, $V_{FB}$ drops below $V_{REF\_B}$ and NO_SWITCH is asserted causing PWM controller 212 to enter non-switching mode. As illustrated, no output pulses are generated on PWM_CTRL while PWM controller 212 is in non-switching mode. Once in non-switching mode, $V_{OUT}$ will eventually begin to fall back down and $V_{FB}$ will rise. At time $t_2$, LT_DETECT is asserted because $V_{SENSE}$ falls below $V_{REF\_A}$. When PWM controller 212 detects the rising edge of LT_DETECT, PWM controller 212 returns to switching mode. At the same time, clock generator 210 resets the PWM_CLK on the next cycle of FAST_CLK as described above. PWM controller 212 then continues to operate in switching mode. Thus, the PWM controller 212 enter switching mode synchronously with FAST_CLK instead of waiting for $V_{FB}$ to rise above $V_{REF\_B}$ (and NO_SWITCH to reset) at time $t_3$. Instead, the PWM controller 212 enters switching mode based on the rising edge of LT_DETECT, which has a faster response time than $V_{FB}$. As a result, converter 202 will be able to stabilize $V_{OUT}$ in response to the load transient more quickly compared to conventional architectures.

Figure 6A:
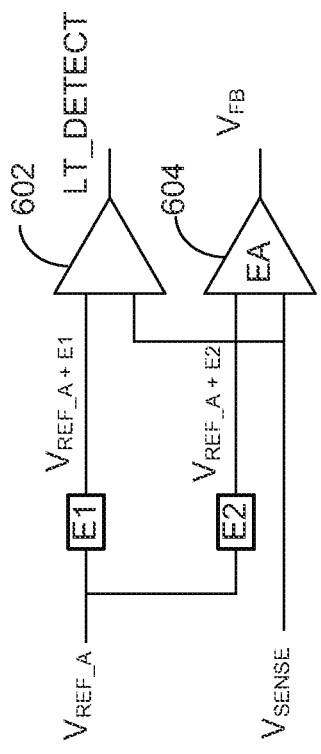
FIG. 6A is a circuit diagram modeling input errors of a comparator and error amplifier circuit.
Figure 6B:
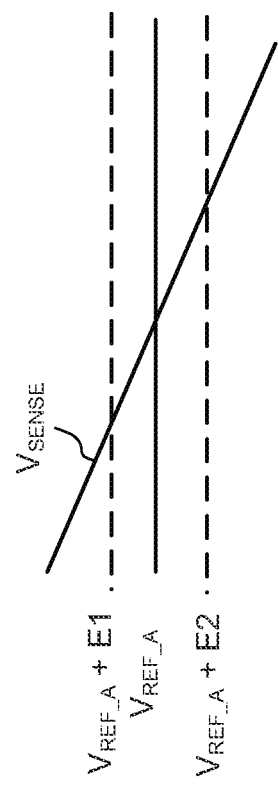
FIG. 6B illustrates example waveforms illustrating the effect of varying input errors associated with different devices.

Although error amplifier 204 and first comparator 206 are illustrated as separate devices for clarity of description, in one embodiment, a combined error amplifier/comparator may be used in order to alleviate potential imprecision associated with varying intrinsic characteristics of separate devices. As illustrated in FIG. 6A, different intrinsic device characteristics of a comparator 602 and error amplifier 604 are modeled as input errors E1 and E2 on the reference voltage input $V_{REF\_A}$. FIG. 6B is a waveform diagram illustrating the effect of the input errors. As can be seen, comparator 602 effectively compares $V_{SENSE}$ to an offset reference voltage $V_{REF\_A}+E1$ while error amplifier 604 effectively compares $V_{SENSE}$ to a different offset reference voltage $V_{REF\_A}+E2$. As a result, the comparator 602 may detect load transients earlier than, or later than, desired depending on the magnitude of the input errors E1, E2.

Figure 7:
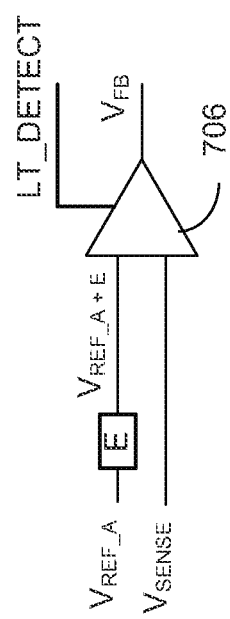
FIG. 7 is a circuit diagram illustrating a combined error amplifier/comparator, according to one embodiment of the present invention.

FIG. 7 illustrates a combined error amplifier/comparator 706 that outputs both LT_DETECT and the error amplifier output $V_{FB}$. Rather than use separate internal transistors to implement the comparator 206 and the error amplifier 204, the combined error amplifier/comparator 706 uses the comparator transistors internal to the error amplifier to generate LT_DETECT. For example, in one embodiment, the combined error amplifier/comparator 706 comprises a conventional error amplifier for generating error signal $V_{FB}$, and additionally includes a buffer that buffers $V_{FB}$ to produce comparator output LT_DETECT. In this manner, any input error E affecting $V_{REF\_A}$ will affect $V_{FB}$ and LT_DETECT equally, thus eliminating the error offset problem described above.

Thus, the switching regulator of the present invention beneficially utilizes a fast clock to adjust PWM control to load transients, while using a slower PWM clock for steady-state switching. As a result, the switching regulator responds more quickly to changes in the load than with conventional architectures that utilize only the slower PWM clock. Beneficially, the switching regulator therefore provides improved transient response without sacrificing the power efficiency.

Upon reading this disclosure, those of skill in the art will appreciate still additional alternative designs for a switching voltage regulator having the features described herein. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A switching regulator, comprising:
   a PWM controller configured to receive a PWM clock signal and generate a PWM control signal based on the PWM clock signal;
   a power converter configured to receive the PWM control signal from the PWM controller and provide regulated power to a load, the regulated power controllable by varying a duty cycle of the PWM control signal;
   a load transient detection circuit configured to detect an increase in load exceeding a detection threshold and assert a load transient detection signal responsive to detecting the increase in load exceeding the detection threshold; and
   clock reset logic to assert a clock reset signal responsive to the load transient detection signal being asserted; and
   a clock divider coupled to the clock reset logic, the clock divider to receive a fast clock signal and divide a frequency of the fast clock signal to generate the PWM clock signal, the PWM clock signal having a lower frequency than the fast clock signal, wherein responsive to the clock reset signal being asserted, the clock divider resets the PWM clock signal to synchronize a next clock cycle of the PWM clock signal with a next clock cycle of the fast clock signal occurring after the clock reset signal is asserted, and wherein the clock divider is further configured to continue to generate new clock cycles of the PWM clock signal at the PWM clock frequency after resetting the PWM clock signal.

2. The switching regulator of claim 1, wherein the load transient detection circuit comprises:
   a first comparator configured to compare a sensed output voltage of the power converter to a first reference voltage representing the detection threshold and generate the load transient detection signal indicating a comparison result.

3. The switching regulator of claim 1, further comprising:
   a voltage feedback circuit configured to sense an output voltage of the power converter and generate an error signal representing a difference between the sensed output voltage and a first reference voltage representing the detection threshold, wherein the PWM controller controls the duty cycle of the PWM control signal to maintain the error signal within a fixed voltage range.

4. The switching regulator of claim 3, wherein the voltage feedback circuit comprises:
   a voltage divider configured to receive the output voltage of the power converter and generate a sense voltage proportional to the output voltage of the power converter; and
   an error amplifier having a negative input terminal, a positive input terminal, and an output terminal, wherein the negative input terminal is coupled to receive the sensed output voltage and the positive input terminal is coupled to receive the first reference voltage, and wherein the output terminal outputs the error signal to the PWM controller.

5. The switching regulator of claim 1, further comprising: a sleep mode control circuit configured to detect a decrease in the load exceeding a detection threshold and controlling the PWM controller to enter a non-switching mode responsive to the detection.

6. The switching regulator of claim 5, wherein the sleep mode control circuit comprises:
a second comparator configured to compare an error signal to a second reference voltage, the error signal representing a difference between a sensed output voltage of the power converter and a first reference voltage representing the detection threshold, the second comparator further configured to control the PWM controller to enter the non-switching mode signal responsive to the error signal falling below the second reference voltage.

7. The switching regulator of claim 5, wherein the PWM controller monitors the load transient detection signal outputted from the first comparator, and return the PWM controller to switching mode synchronously with the fast clock responsive to the load transient detection signal indicating that the sensed output voltage falls below the first reference voltage.

8. The switching regulator of claim 1, further comprising: a current sensor configured to sense current through a PWM switch of the power converter and output a current feedback voltage representative of the sensed current to the PWM controller, wherein the PWM controller controls the duty cycle of the PWM control signal to maintain the sensed current below a peak current level.

9. A method for controlling a switching regulator, comprising:
receiving a fast clock signal;
dividing a frequency of the fast clock signal to generate a PWM clock signal, the PWM clock signal having a lower frequency than the fast clock signal;
generating a PWM control signal having a PWM frequency based on a PWM clock signal;
applying the PWM control signal to control switching of a power converter;
controlling a duty cycle of the PWM control signal such that the power converter provides regulated power to a load;
detecting an increase in the load exceeding a detection threshold; and
responsive to detecting the increase in the load exceeding the detection threshold, asserting a clock reset signal;
responsive to the clock reset signal being asserted, resetting the PWM clock signal to synchronize a next clock cycle of the PWM clock signal with a next clock cycle of the fast clock signal occurring after the clock reset signal is asserted; and
continuing to generate new clock cycles of the PWM clock signal at the PWM clock frequency after resetting the PWM clock signal.

10. The method of claim 9, wherein detecting the increase in the load comprises:
comparing a sensed output voltage of the power converter to a first reference voltage representing the detection threshold.

11. The method of claim 9, further comprising:
generating a sensed output voltage proportional to an output voltage of the power converter;
amplifying a difference between the sensed output voltage and a first reference voltage representing the detection threshold to generate an error signal; and
controlling a duty cycle of the PWM control signal to maintain the error signal within a fixed voltage range.

12. The method of claim 9, further comprising:
detecting a decrease in the load exceeding a detection threshold; and
responsive to detecting the decrease in the load exceeding the detection threshold, configuring the power converter in a non-switching mode.

13. The method of claim 12, further comprising:
monitoring a sensed output voltage while the power converter in the non-switching mode; and
returning the PWM controller to a switching mode synchronously with a next clock cycle of the fast clock responsive to the load transient detection signal indicating that the sensed output voltage falls below a reference voltage.

14. The method of claim 9, further comprising:
sensing current through a PWM switch of the power converter; and
controlling a duty cycle of the PWM control signal to maintain the sensed current below a peak current level.

15. A controller circuit for a switching regulator, comprising:
a PWM controller configured to receive a PWM clock signal and generate a PWM control signal based on the PWM clock signal, the PWM control signal for controlling switching of a power converter;
a load transient detection circuit configured to detect an increase in load exceeding a detection threshold and assert a load transient detection signal responsive to detecting the increase in load exceeding the detection threshold; and
clock reset logic to assert a clock reset signal responsive to the load transient detection signal being asserted; and
a clock divider coupled to the clock reset logic, the clock divider to receive a fast clock signal and divide a frequency of the fast clock signal to generate the PWM clock signal, the PWM clock signal having a lower frequency than the fast clock signal, wherein responsive to the clock reset signal being asserted, the clock divider resets the PWM clock signal to synchronize a next clock cycle of the PWM clock signal with a next clock cycle of the fast clock signal occurring after the clock reset signal is asserted, and wherein the clock divider is further configured to continue to generate new clock cycles of the PWM clock signal at the PWM clock frequency after resetting the PWM clock signal.

16. The controller circuit of claim 15, further comprising:
a switching mode control circuit configured to detect a decrease in load and outputting a non-switching mode control signal to the PWM controller responsive to the detection,
wherein the PWM controller enters a non-switching mode responsive to receiving the switch mode control signal, and wherein the PWM controller returns to switching mode synchronously with the fast clock responsive to a sensed output voltage falling below a reference voltage.

* * * * *